Aug. 16, 1932.    C. F. COWDREY    1,872,123
AUTOMOBILE BRAKE TESTING MACHINE
Filed Nov. 15, 1926    4 Sheets-Sheet 1
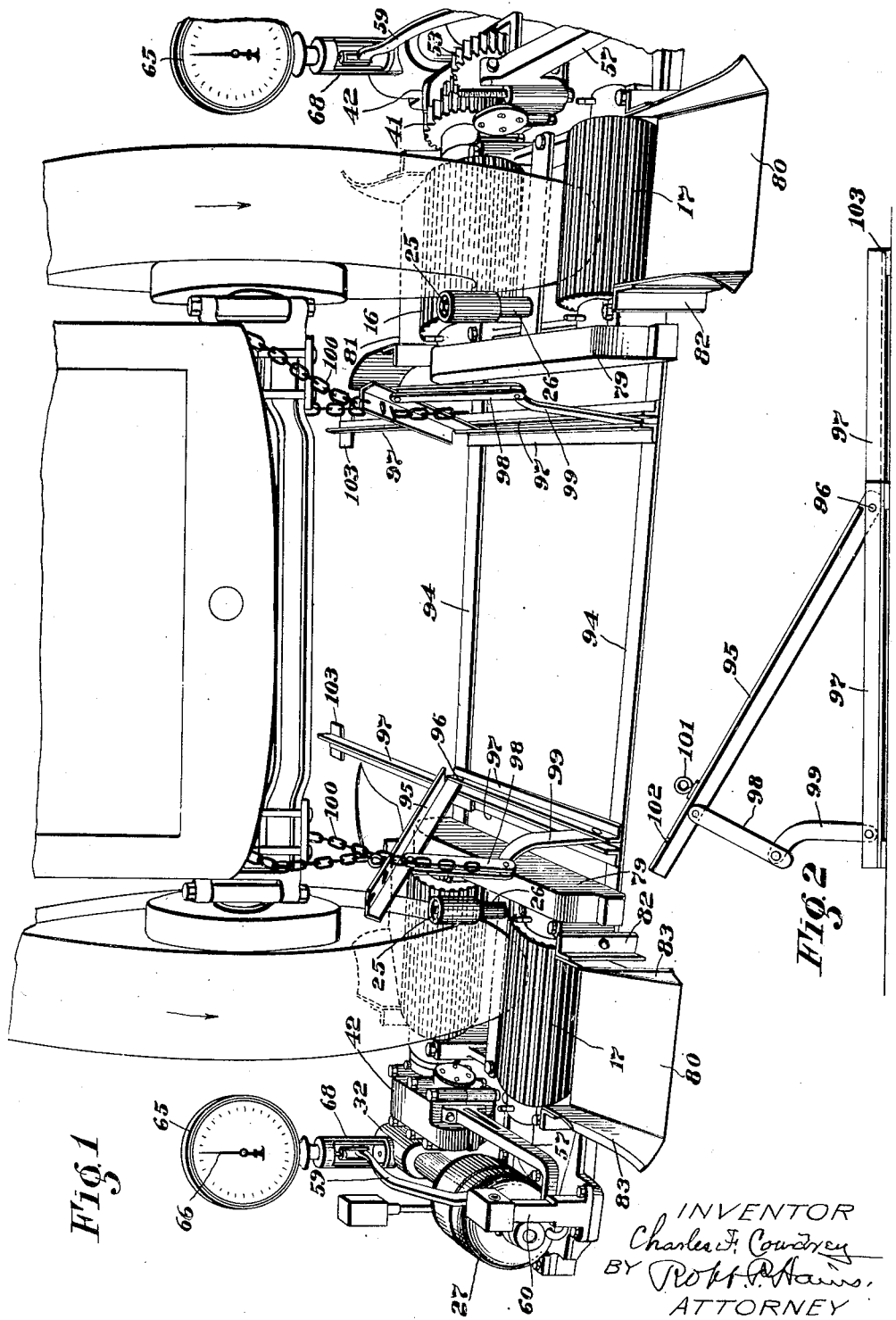

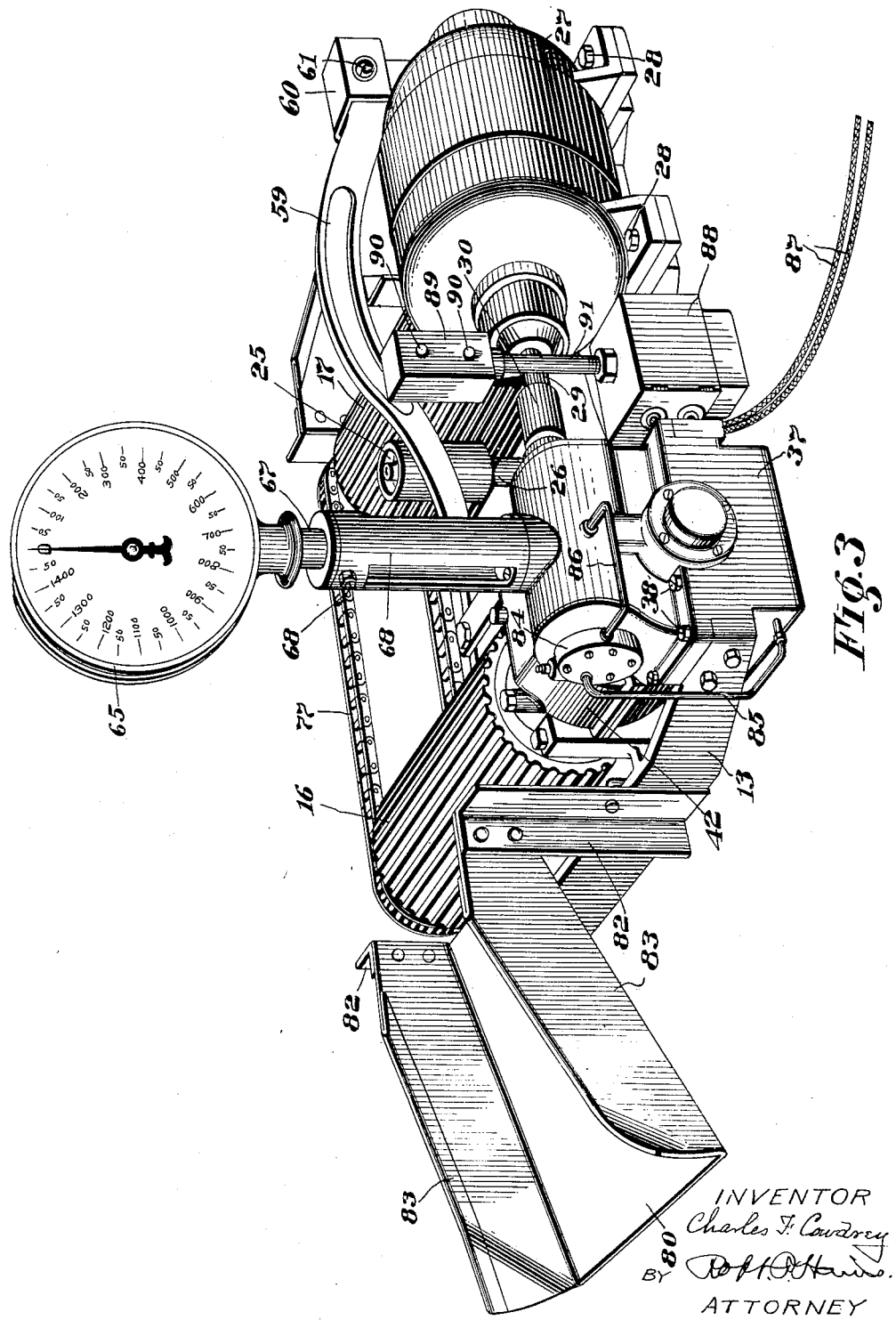

Aug. 16, 1932.  C. F. COWDREY  1,872,123
AUTOMOBILE BRAKE TESTING MACHINE
Filed Nov. 15, 1926  4 Sheets-Sheet 3
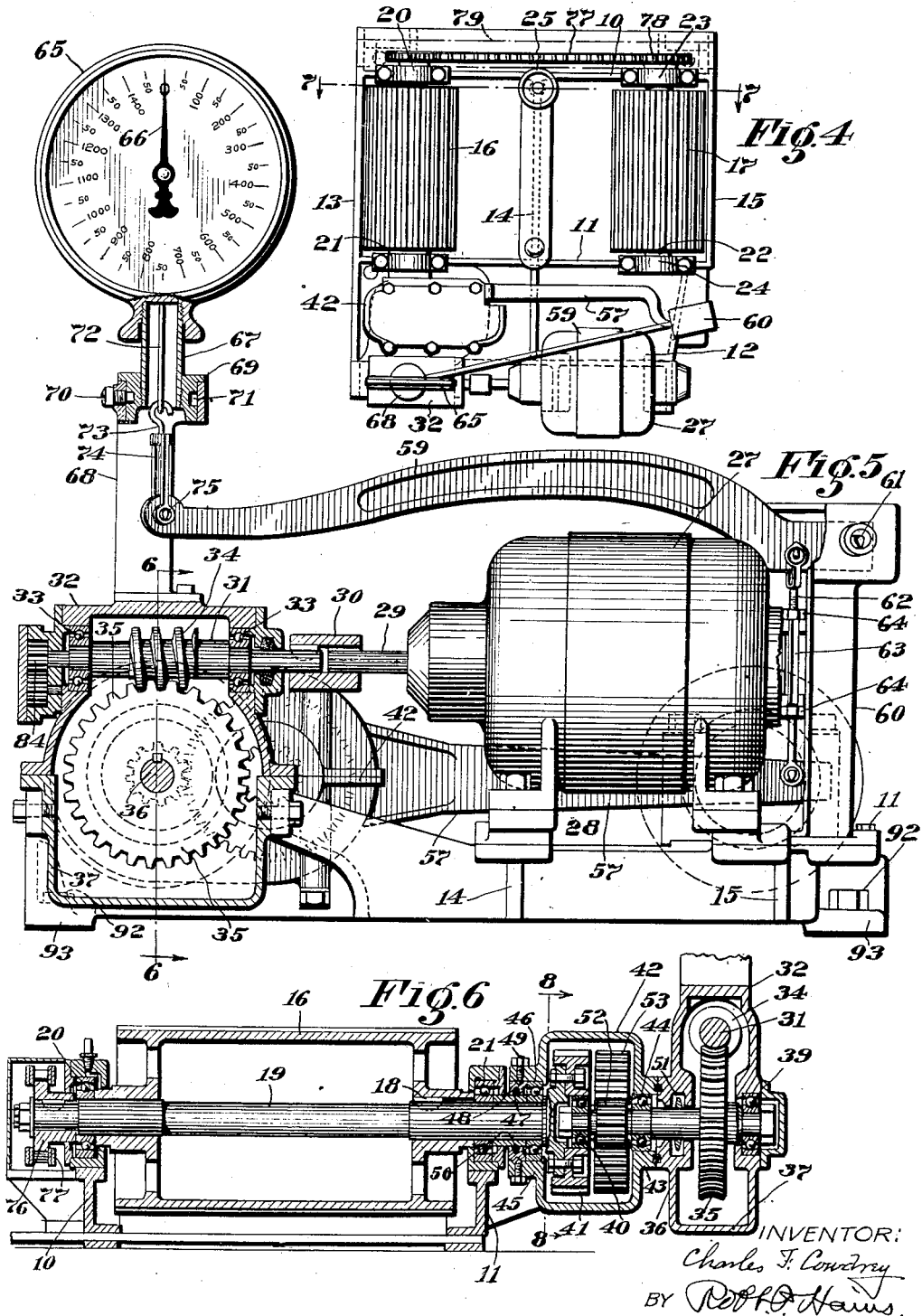
INVENTOR:
Charles F. Cowdrey
BY
ATTORNEY

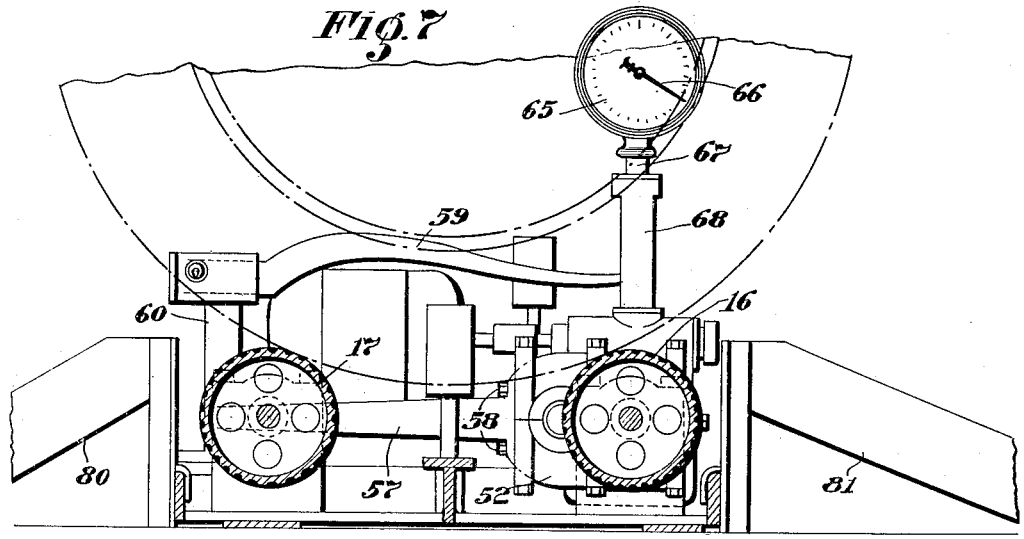
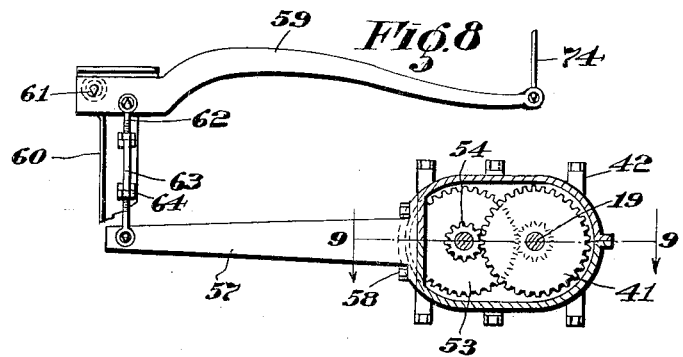
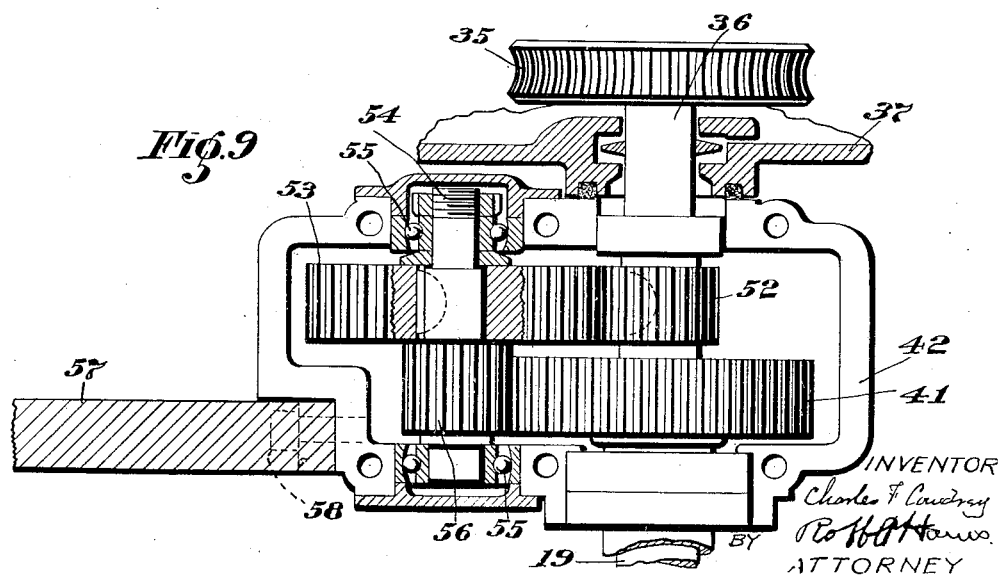

Patented Aug. 16, 1932

1,872,123

UNITED STATES PATENT OFFICE

CHARLES F. COWDREY, OF FITCHBURG, MASSACHUSETTS, ASSIGNOR TO THE COWDREY BRAKE TESTER ORGANIZATION, INCORPORATED, OF FITCHBURG, MASSACHUSETTS, A CORPORATION OF MASSACHUSETTS

AUTOMOBILE BRAKE TESTING MACHINE

Application filed November 15, 1926. Serial No. 148,358.

This invention relates to machines for rotating the wheels of an automobile under brake resistance and for indicating the turning force applied to each wheel to turn the wheel under brake resistance.

It is of primary importance that the brakes of automobiles be kept properly adjusted so that the speed of an automobile may be quickly checked in case of an emergency without causing the automobile to swerve from a straight path.

The prompt checking of the speed of an automobile without causing the same to skid or swerve from a direct path can be secured only by maintaining the brakes adjusted so that they will act with equal or substantially equal force on the opposite wheels of the automobile, but the correct adjustment of the brakes is difficult or impossible to secure unless means is provided for turning the opposite wheels of an automobile under brake resistance, and for indicating the force required to turn each wheel under the brake action.

The present invention is therefore directed to independently operable brake testing devices for rotating the different wheels of an automobile through a complete revolution under brake resistance and for indicating the force required to turn each wheel so that the action of the brakes upon the opposite wheels may be compared and equalized.

One important feature of the present invention resides in a compact self-contained brake-testing unit provided with means for supporting a wheel of an automobile and for rotating it under brake resistance, and including a motor for operating the wheel supporting and rotating means and an indicator for indicating the force applied to rotate the wheel. In testing the brakes of an automobile a pair of these brake testing units are preferably employed so that the action of the brakes upon the opposite wheels may be tested at the same time. If an automobile provided with brakes upon all four wheels is to be tested, four of these brake testing units may be employed, but two brake testing units will suffice since first one pair of wheels and then the other may be tested upon the two brake testing units.

Another feature of the invention resides in the construction and assemblage of the operating parts forming a brake testing unit and in means for indicating the turning force applied to a wheel to turn it under brake resistance.

Another feature of the invention resides in the association of an idle roll with the wheel supporting and turning means, and which is adapted to engage a side face of the wheel to retain the wheel in place upon the supporting and rotating means.

Still another feature of the invention resides in an adjustable indicating device for each brake testing unit which is adapted to be adjusted so that the indicators for a pair of brake testing units may be easily read from a common observation point in order that both indicating devices may be observed and their reading compared throughout the testing of the brakes upon the opposite automobile wheels.

Other features of the invention and novel combination of parts in addition to the above will be hereinafter described in connection with the accompanying drawings, which illustrate one good practical form of the invention.

In the drawings:—

Fig. 1 is a perspective view showing the front wheels of an automobile in position to be tested upon a pair of brake testing devices constructed in accordance with the present invention;

Fig. 2 is a side view of anchoring means to be described;

Fig. 3 on an enlarged scale is a perspective view of one of the brake testing units of Fig. 1;

Fig. 4 is a top plan view of Fig. 3;

Fig. 5 is a side elevation of Fig. 4 looking toward the electric motor, the gear casing being shown in vertical section;

Fig. 6 is a sectional view taken on the line 6—6 of Fig. 5;

Fig. 7 is a sectional view taken on the line 7—7 of Fig. 4;

Fig. 8 is a sectional view taken on the line 8—8 of Fig. 6; and

Fig. 9 on an enlarged scale is a sectional view taken on the line 9—9 of Fig. 8.

In the embodiment of the invention shown in the drawings the various parts forming a brake testing unit are mounted in close relation to each other upon a supporting frame so that a compact, self-contained, portable unit is formed, the construction being such that when a brake testing unit is placed upon the floor of a garage or other building where the automobile brakes are to be tested, the automobile may readily be driven onto a brake testing unit or units under its own power.

The frame for supporting the various parts of the brake testing unit, as will be apparent from Fig. 4 of the drawings is approximately square in plan view, and is formed of the longitudinally extending beams 10, 11 and 12 which are secured to the transversely extending braces 13, 14 and 15.

The means for supporting the wheel of an automobile and for rotating it under brake resistance may be variously constructed and as shown consists of a pair of spaced rollers 16 and 17 the faces of which are preferably provided with longitudinally extending ribs for increasing the friction between the rollers 16 and 17 and the automobile wheel which these rollers support and rotate. The construction of the surfaces of the rollers is preferably such that the frictional engagement between these rollers and the wheel will be approximately equal to the frictional engagement of the wheel of the automobile with the usual dry roadbed. The roller 16 is rigidly secured by means of a key 18 to its supporting shaft 19, the opposite ends of which shaft are supported in the anti-friction bearings 20 and 21, the bearing 20 being supported by the beam 10 of the frame, while the bearing 21 is supported by the beam 11 of this frame. The roller 17 is likewise keyed to a supporting shaft 22 the opposite ends of which are supported by anti-friction bearings 23 and 24 supported by the beams 10 and 11.

The rollers, it will be noted, are cylindrical in shape throughout their length, and are free from end flanges adapted to engage the side face of an automobile tire. Such end flanges are not employed because by omitting the same, less clearance space is required between the rollers and their supporting frame, and as a result the axes of the rollers 16 and 17 may be disposed near the ground, thus reducing the height of the brake testing device. The automobile wheel engaging the rollers is prevented from working lengthwise thereof, in accordance with the present invention, by providing an idle roll 25 which may be mounted on a stub shaft 26 which extends upwardly from the supporting frame intermediate the rollers 16 and 17, and near one end of these rollers, as will be apparent from the drawings. The arrangement of the idle roll 25 is such that if the wheel of an automobile tends to work lengthwise of the rollers the roll 25 will engage either the inner or outer face of the wheel, depending upon the location of the roll, and thus arrest the movement of the wheel lengthwise of the rollers. The roll 25, it will be noted, is shown in Fig. 3 as positioned near the driving motor, to be described, while it is shown in Fig. 1 as adjacent the opposite end of the rollers 16, 17.

As above stated, the rollers 16 and 17 are adapted to support a wheel of an automobile and to turn the same under brake resistance, and while various means might be employed for driving these rollers, this is accomplished in the embodiment of the invention shown by an electric motor 27 the casing of which is preferably rigidly secured to the supporting frame by the bolts 28. In most cases it will be found desirable to rotate the wheel of the automobile that is being tested at a relatively low speed so that the friction exerted by the brakes will not appreciably heat up the brake bands and parts with which they cooperate. It is also desirable to rotate the wheels slowly so that any variations in the readings of the indicating means, to be described, may be readily observed to determine the action of the brake upon the wheel during the rotation of the wheel through a complete revolution. There is still a further advantage to be secured by rotating the wheel of an automobile at a slow speed throughout the brake testing operation in that this permits the use of a small electric motor which may be driven from the usual electric light circuit, thus making it unnecessary to equip the building in which the brake testing device is to be used with special wiring to operate a large motor.

In order to rotate the rollers 16 and 17 at the desired reduced speed, a series of reducing gears is provided between the driving motor 27 and the roller supporting shaft 19 which is driven thereby. In the embodiment of the invention shown the driving shaft 29 of the electric motor is connected by a coupling 30 to a worm shaft 31 which is rotatably mounted in a gear casing 32, and the oposite ends of the shaft 31 are preferably provided with the anti-friction bearings 33 for supporting the same within the gear casing. The worm shaft 31 is provided with the worm 34 which meshes with the worm wheel 35, and this wheel is keyed or otherwise rigidly secured to a shaft 36 which extends transversely of the casing 32 and is disposed in axial alignment with the roller supporting shaft 19. The casing 32 for the worm shaft, as shown, encloses the upper portion of the worm gear 35, and the lower portion of this gear rotates within the gear casing 37 to which the casing 32 is secured by the bolts 38. The gear casing 37 is rigidly secured to the braces 12 and 13 of the supporting frame. One end of the transversely extending shaft 36 is journaled in an anti-friction bearing 39 mounted within the gear casing 37, and the inner end of the shaft 36, in the construction shown, is rotatably supported by an anti-friction bearing 40 which is mounted within a gear 41 that is rigidly secured to the inner end of the roller shaft 19, this arrangement being desirable to insure proper alignment of the shafts 19 and 36, while at the same time rotation of one shaft relative to the other is permitted.

In carrying out the present invention it is essential that means be provided for indicating the force applied to the rollers 16 and 17 to turn the automobile wheel resting thereupon under brake resistance, and while various means to this end might be provided, a good practical form of mechanism will now be described. Between the inner face of the gear casing 37 and the roller supporting beam 11 of the frame is mounted the rocking gear casing 42. This gear casing is supported for rocking movement by the aligned shafts 19 and 36, and the hub 43 at one side of this casing is supported for rocking movement by the anti-friction bearing 44 mounted upon an intermediate portion of the shaft 36. The hub 45 at the opposite side of the rocking gear casing is supported by the anti-friction bearing 46 which is mounted upon a spacing sleeve 47 provided upon the inner end portion of the roller shaft 19. Upon the sleeve 47 is mounted an adjusting ring 48 which is held in abutting engagement with the outer ring of the anti-friction bearing 46 by the adjusting screws 49. The parts mounted upon the spacing sleeve 47 are lubricated from the oil well 50 formed in the ring 48, and the bearing formed between the outer face of the hub 43 and the inner face of the gear casing 37 is lubricated from the oil well 51 formed in the casing 37.

Upon the inner end of the shaft 36 is keyed or otherwise secured a pinion 52, and this pinion meshes with a gear 53 which is mounted upon a transversely extending shaft 54 disposed at one side of the aligned shafts 19, 36. The ends of the shaft 54 are rotatably supported by the anti-friction bearings 55 mounted in the side walls of the rocking casing 42. In the construction shown the gear 53 is keyed to its shaft 54 and rigidly secured to the gear 53 is a pinion 56 which meshes with the gear 41 that is fastened to the inner end of the roller-supporting shaft 19.

The arrangement of the gears mounted within the casing 42 is such that rotation of the pinion 52 will rotate the gears 53 and 56 to drive the gear 41 and its shaft 19, but the transmission of power through these gears will tend to rock the casing 42 about the aligned shafts 19 and 36, and this rocking movement is utilized to operate an indicating device to be described. To this end a horizontally extending arm 57 is secured to the rocking gear casing 42 by bolts 58, and the outer end of the rocking arm 57 is connected to a scale beam 59. This scale beam is pivotally mounted within the upper portion of a hollow bracket 60 by the trunnions or knife blades 61. The lower end of this bracket 60 is secured by bolts to the supporting frame. The outer end of the arm 57 is connected to the scale beam 59 by the connecting rods 62 and the effective length of these rods may be adjusted as desired by turning the turn buckle 63 having the lock nuts 64. The outer end of the scale beam 59, in the construction shown, is operatively connected to an indicating gauge 65 having a pointer 66 which swings over the face of the gauge. The indicating gauge 65 is provided with a supporting post 67 which is mounted in a bracket 68 the lower end of which is bolted or otherwise secured to the worm shaft casing 32.

As above pointed out it is highly desirable that the indicating gauge 65 be supported for rotative movement so that it may be turned to facilitate reading of the same from any desired observation point. To this end the lower portion of the supporting post 67 of the indicating device is threaded or otherwise secured to a collar 69 that is rotatably mounted in a ring formed at the upper end of the bracket 68, and the collar 69 is rotatably secured to the ring by a bolt 70 the inner end of which projects into an annular groove 71 formed in the outer face of the collar 69. The pointer 66 of the indicating device is operated by a downwardly extending rod 72 the lower end of which is connected by a swivel 73 to a bifurcated connecting link 74 the lower ends of which are connected to a pin 75 at the outer end of the scale beam 59.

It will be understood from the foregoing description of the mechanism for indicating the force applied to the wheel supporting rollers to turn a wheel under brake resistance that as the power imparted to the wheel supporting rollers increases, the floating gears 53 and 56 within the casing 42 will tend to move the arm 57 of this casing in a downward direction, thus exerting a downward pull upon the scale beam 59, which pull will be yieldingly resisted by a spring (not shown) within the indicating casing 65. As a result of this construction the tendency of the gear casing 42 to rock downwardly about its aligned supporting shafts 19 and 36 is resisted by the spring within the casing 65, and the pointer 66 will move over the face of the dial in response to variations in the downward pull exerted by the lever 57. It will also be understood that as a result of the described mounting for the indicating device 65 and the swivel 73, the indicating device may be turned to face in any desired direction without affecting the reading of the same.

It is desirable that both of the wheel-supporting rollers 16 and 17 be positively driven so that each of these rollers will help to turn the wheel resting thereupon under brake resistance. To this end, in the construction shown, the roller supporting shaft 19 which is driven by the mechanism above described, is provided at its outer end with a sprocket 76 adapted to receive the driving chain 77, which chain passes around a similar sprocket 78 rigidly secured to the outer end of the shaft 22 for the roller 17. The sprockets 76 and 78 and the sprocket chain 77 are preferably enclosed in a protecting casing 79.

The reducing gears provided between the motor 27 and roller 17 will serve to turn the automobile wheel at a sufficiently slow speed to permit variations in the brake action upon different portions of the wheel during one complete revolution to be noted. This is important because it frequently happens that the brake drums are slightly elliptical in shape, or are slightly eccentric with respect to the automobile wheel, in which case the brake bands will act with varying force upon the wheel during a complete rotation. This condition cannot be detected unless the automobile wheel is turned slowly. The reducing gears have a further advantage in that they permit the use of a small electric motor to rotate a wheel under strong brake resistance, and make it unnecessary to employ large high voltage motors for this purpose.

The brake testing unit so far described may be mounted upon the floor of a garage or other building in which the brakes of an automobile are to be tested, or if desired the brake testing unit may be mounted in a hole in the floor so that the upper faces of the rollers 16 and 17 will lie approximately flush with the floor of the building. If the brake testing device is mounted upon the floor of the building, and not in a hole or depression, it will be desirable to provide runways at the opposite ends of the brake testing device so that an automobile may be driven on and off this device under its own power. The brake testing device is therefore shown as having an inclined runway 80 at one end thereof and a similar inclined runway 81 at the opposite end thereof. One end of each inclined runway rests upon the floor or ground and the opposite end is supported in a raised position by the uprights 82, the lower ends of which are secured to the transversely extending braces 13 and 15 of the supporting frame. Each inclined runway is provided with the upstanding side walls 83 which serve to guide a wheel into proper position upon the supporting rollers 16 and 17.

It is important that the various gears and other operating parts be at all times well lubricated, and this is accomplished in accordance with the present invention by providing the gear casing 32 with a small gear pump 84 of well known construction, and oil is supplied to this pump from an oil reservoir in the lower portion of the casing 37 by the oil pipe 85. Oil is conducted from the discharge side of the oil pump to the interior of the casing 32 by an oil pipe 86 and it may be discharged from the pipe 86 onto the worm 34 and other parts to be lubricated.

The electric current for operating the motor 27 may be supplied by the conductor wires 87 which lead into the fuse box 88, and the switch for starting and stopping the motor 27 is preferably mounted within the switch box 89 having the switch control buttons 90. In order that the push buttons of this switch may be easily reached without stooping over appreciably, the switch box is shown as supported in an elevated position from the fuse boxes by the post 91.

It will be apparent from the foregoing description, when read in connection with the drawings, that the brake testing unit forming the subject matter of the present invention is complete within itself, and that all parts of the operating device are mounted upon a single frame so that the brake tester may be readily shipped and placed upon the floor of a building ready for use. The brake testing device may be employed to test the brakes upon either the front or rear wheels of an automobile, and, as above stated, the automobile to be tested may be driven onto the brake testing rollers 16 and 17 under its own power. Where both the front and rear wheels of an automobile are to be tested upon the same pair of brake testing units, or upon four separate units, it may be desirable to drive the automobile completely over the units, and in order that this may be done, the brake testing units have been given a construction which is sufficiently low and compact to permit the running boards of an automobile to clear the brake testing devices when the same lie between the front and rear wheels of the automobile.

It is desirable to test the brakes upon the opposite wheels of an automobile at the same time, since the true action of the brakes upon the opposite wheels cannot be determined if the test is made while one wheel is rotated and the other is standing still. It is therefore desirable to employ two brake testing units such as shown in Fig. 3 of the drawings. These units may be secured directly to the floor of the building where the test is to be made, in spaced relation to each other, by the securing bolts 92 which project through the frame supporting lugs 93 into the floor of the building. In the construction shown in Fig. 1 the pair of brake testing units, instead of being bolted directly to the floor of a building, are bolted to the spacing bars 94 which may extend along the floor of the building between the two brake testing units, as will be apparent from Fig. 1.

The automobile wheels being tested are rotated by the rollers 16 and 17 in the direction indicated by the arrows, and when the brakes are applied hard the automobile wheels will tend to climb up out of the depression between the spaced rollers 16 and 17, that is, the automobile will tend to move rearwardly from the position in which it is shown in Fig. 1. To prevent this, anchoring means is provided, and in the construction shown the anchoring means is made collapsible so that when it is not being used it will drop down out of the way of the under gear of the automobile. This anchoring mechanism as shown consists of a rocking lever 95 one end of which is pivotally secured by a pivot pin 96 between a pair of angle bars 97 which in turn are secured to the spacing bars 94. The rocking movement of the lever 95 in an upward direction is limited by the pivotally connected links 98 and 99, the upper end of one being pivotally secured to the lever 95 and the lower end of the other being pivotally secured to the angle bars 97. One end of an anchoring chain 100 is secured to an anchoring ring or eye 101 fastened to the bar 95 and this chain is adapted to be looped over an axle of the automobile, and after it is drawn tight the free end of the chain may be fastened to the lever 95 by engaging one of the links of the same in a notch or slot 102 formed in a face of the lever.

The pull exerted upon the anchoring chains 100 when the automobile tends to move rearwardly off the brake testing device shown in Fig. 1 may tend to tilt the front portion of the entire brake testing apparatus upwardly. This is readily prevented by projecting one of each pair of the bars 97 rearwardly a substantial distance so that it extends well under the automobile as shown, and at the rear end of said bar is provided a foot 103 which rests upon the floor of the building to prevent the tilting movement just mentioned.

By making each brake testing unit forming the subject matter of the present invention complete within itself the unit is easy to install ready for use, and each brake testing unit may be operated independently of the other brake testing devices, or simultaneously therewith, as desired. Through the use of a pair of brake testing units such as shown in Fig. 1 of the drawings the brakes of an automobile may be easily tested and adjusted within a very short period of time, since both automobile wheels may be rotated by the brake testing devices throughout the adjustment of the brake bands, and since the indicating devices 65 of both brake testing units may be turned so that they may be read from a common observation point; it is merely necessary for one person engaged in the testing of the automobile brakes to stand off at a distance from the automobile so that he can observe both gauges 65 throughout the brake testing operation, and call out from time to time the reading of the gauges so that the workman engaged in adjusting the brake bands will know whether to tighten or loosen the brake bands. In this manner the desired brake adjustment may be secured in a very few minutes.

During the operation of testing the brake bands upon the different wheels of an automobile the brake applying foot pedal should be held depressed to the same extent while the action of the brakes upon the opposite wheels is being tested. Various means might be employed for holding the foot pedal depressed, and one good practical construction to this end is disclosed in the Charles F. Cowdrey Patent No. 1,568,804, granted January 5, 1926.

What is claimed is:—

1. A brake tester for testing the action of the brakes on the wheels of an automobile that the brake resistance on the opposite wheels may be measured and equalized, comprising in combination wheel supporting and turning means mounted to support and turn one side wheel of an automobile, another wheel supporting and turning means to support and turn the opposite wheel of an automobile, mechanism for operating the supporting means for the two wheels either separately or simultaneously including, a separate motor for operating each of the opposite wheel supporting and turning means independent of the other wheel supporting and turning means to turn the wheel resting thereon through a complete rotation while under brake resistance, a pressure responsive driving connection between each wheel supporting and turning means and its motor, and an indicating device associated with each pressure resposive driving connection and adapted to be operated thereby to indicate the force necessary to turn the adjacent automobile wheel under brake resistance.

2. A brake tester for testing the action of the brakes upon the wheels of an automobile that the brake resistance on opposite wheels may be measured and equalized, comprising in combination, a brake testing unit for testing the brake action upon a wheel at one side of the automobile and a second brake testing unit for testing the brake action upon the opposite wheels of the automobile whereby the brakes upon the opposite wheels may be tested simultaneously or separately; each unit being complete within itself and comprising wheel supporting and turning means, a motor mounted adjacent the wheel supporting and turning means to turn the same and rotate the supported wheel through a complete revolution under brake resistance, a pressure responsive driving connection between each wheel supporting and turning means and its motor, and an indicating device associated with each pressure responsive driving connection and adapted to be operated thereby to indicate the force necessary to turn the adjacent automobile wheel under brake resistance.

3. A brake tester for testing the action of the brakes on the wheels of an automobile that the brake resistance on the opposite wheels may be measured and equalized, comprising in combination, wheel supporting and turning means mounted to support and turn one wheel of an automobile, another wheel supporting and turning means for supporting and turning the opposite wheel of the automobile, driving means for operating the wheel supporting and turning means for one wheel including a train of gears one of which is mounted for floating movement in response to variations in load, driving means for operating the wheel supporting and turning means for the opposite wheel including another train of gears one of which is mounted for floating movement in response to variations in load, and a pair of indicators one adapted to be operated by the movement of one of said floating gears to indicate the turning force imparted to one wheel and the other operated by the movement of the other floating gear to indicate the turning force imparted to the other wheel.

4. A compact self contained unit for testing the brakes of an automobile that the brake resistance on opposite wheels may be measured and equalized, comprising a support, wheel supporting and turning rollers mounted on the support for turning a wheel of an automobile through a complete revolution while under brake resistance, a driving motor upon said support, a pressure responsive driving connection positioned between said motor and the end of a roller disposed at the outer side of the wheel upon the rollers, and indicating means associated with said driving connection to indicate the force necessary to turn the wheel resting on the wheel supporting and turning rollers through a complete revolution while under brake resistance.

5. A brake tester for testing the action of a brake upon a wheel of an automobile, comprising in combination, a supporting frame provided with rollers for supporting and rotating the wheel to be tested, power means for driving said rollers to turn the wheel through a complete rotation under brake resistance and including a pressure responsive driving connection positioned between a source of power and the end of a roller at the outer side of the supported wheel and including a train of gears one of the gears of which is mounted for bodily yielding movement in response to variations in load, and indicating means constructed to be actuated by the yielding movement of said gear to indicate the force exerted upon the automobile wheel to turn it under brake resistance.

6. A brake tester for testing the action of a brake upon a wheel of an automobile, comprising in combination, a compact, self-contained unit consisting of a portable frame, wheel supporting and rotating means mounted upon the portable frame to support and rotate a wheel of an automobile through a complete revolution under brake resistance, a motor mounted upon the portable frame to drive the wheel supporting and rotating means, a yielding driving connection positioned between the motor and said wheel rotating means at the outer side of the wheel which it drives, and indicating means operable by said yielding driving connection to indicate the force applied to the wheel to turn it under brake resistance.

7. A brake tester for testing the action of a brake upon a wheel of an automobile comprising in combination, a supporting frame, wheel supporting and rotating means mounted upon the frame to support and rotate a wheel of an automobile through a complete revolution under brake resistance, driving mechanism for said rotating means including a motor and a gear transmitting casing mounted at the outer side of the wheel it drives to rock through a limited angle in response to the variations in force exerted upon the wheel by the driving means and provided with power transmitting gears, and indicating means actuated by the rocking movement of said casing to indicate the force exerted upon the wheel to turn it under brake resistance.

8. A brake tester for testing the action of a brake upon a wheel of an automobile, comprising in combination, a supporting frame, wheel supporting and rotating means mounted upon the frame to support and rotate a wheel of an automobile through a complete revolution under brake resistance, a driving motor, mechanism for transmitting power from the motor to the wheel supporting and rotating means, including a gear casing mounted adjacent the outer side of the wheel it rotates for rocking movement in response to variations in the driving force imparted to the wheel and provided with power transmitting gears, an arm projecting from said casing, and means actuated by the movement of said arm to indicate the turning force exerted upon the wheel to turn it under brake resistance.

9. A brake tester for testing the action of a brake upon a wheel of an automobile, comprising in combination, a supporting frame, wheel supporting and rotating means mounted upon the frame to support and rotate a wheel of an automobile through a complete revolution under brake resistance, a driving motor, mechanism for transmitting power from the motor to the wheel supporting and rotating means, including a gear casing mounted for rocking movement in response to variations in the driving force imparted to the wheel and provided with power transmitting gears, an arm projecting from said casing, a second arm connected to the first arm to multiply the movement of the first arm, and indicating means actuated by the movement of the second arm to indicate the turning force exerted upon the wheel to turn it under brake resistance.

10. A brake tester for testing the action of a brake upon a wheel of an automobile, comprising in combination, a supporting frame, rollers mounted upon the frame to support and rotate a wheel of an automobile under brake resistance, an idle roll positioned between said rollers adjacent one end thereof and mounted to rotate about the axis of an approximately vertical shaft to engage the side of an automobile wheel and retain it in place upon said rollers, means for driving the wheel supporting rollers to turn a wheel through a complete revolution under brake resistance, and means for indicating the force applied to the wheel to turn it under brake resistance.

11. A brake tester for testing the action of a brake upon a wheel of an automobile, comprising in combination, a supporting frame, wheel supporting and rotating means mounted upon the frame to support and rotate a wheel of an automobile under brake resistance, an idle roll positioned at one side of the wheel supporting and rotating means and adapted to engage the side of an automobile wheel to retain it in place upon said rotating means, means for operating said wheel supporting and rotating means to rotate the wheel resting thereupon through a complete revolution under brake resistance, and means for indicating the force applied to the wheel to turn it under brake resistance.

12. A brake tester for testing the action of a brake upon a wheel of an automobile, comprising in combination, a supporting frame, a roller mounted upon the frame to support and rotate a wheel of an automobile under brake resistance, a driving shaft for said roller and having an operating gear secured to the shaft, a power transmitting shaft mounted in axial alignment with said driving shaft and having its end journaled in a bearing carried by said gear, a series of gears for transmitting power from the power shaft to said driving shaft gear and including a floating gear mounted for yielding movement in response to variations in the power transmitted, and indicating means actuated by the movement of said floating gear to indicate the turning force applied to said wheel.

13. A brake tester for testing the action of the brakes on the wheels of an automobile that the brake resistance on the opposite wheels, may be measured and equalized, comprising in combination, wheel supporting and turning means mounted to support and turn one side wheel of an automobile, another wheel supporting and turning means for supporting and turning the opposite wheel of an automobile, driving means for the wheel supporting and turning means to turn each supported wheel through a complete revolution under brake resistance, independent indicating means one for each of the opposite wheel supporting and turning means for indicating the force necessary to turn the wheel resting thereon while under brake resistance, and each indicating means being mounted for a turning movement so that the independent indicating means associated with the different wheels of an automobile may be turned to face a common observation point.

14. A brake testing device for testing the brakes of an automobile that the brake resistance on opposite wheels may be measured and equalized, comprising in combination a support, wheel supporting and turning means mounted upon the support for supporting and turning a wheel of an automobile through a complete revolution under brake resistance, means for driving said wheel supporting and turning means, indicating means for indicating the force applied to a wheel to turn it under brake resistance, and means for supporting the indicating means so that it may be turned to face different observation points whereby the indicating means of the brake testing devices located at the opposite wheels of an automobile may be turned to face a common observation point.

15. A self-contained unit for testing the brakes of an automobile that the brake resistance on opposite wheels may be measured and equalized comprising a support, wheel supporting and turning rollers mounted on the support for turning a wheel of an automobile through a complete revolution while under brake resistance, a motor and transmitting connections between the motor and wheel supporting and turning rollers also mounted on the same support, indicating means secured to the same support for indicating the force necessary to turn the wheel resting on said rollers through a complete revolution while under brake resistance, and means for supporting the indicating means for turning movement so that it may be turned to face different observation points.

16. A brake tester for testing the action of the brakes on the wheels of an automobile that the brake resistance on the opposite wheels may be measured and equalized, comprising in combination, wheel supporting and turning means mounted to support and turn one wheel of an automobile, another wheel supporting and turning means to support and turn the opposite wheels of an automobile, power mechanism for driving each wheel supporting and turning means independently of the other to rotate the wheel resting upon a wheel supporting and turning means through a complete revolution under brake resistance, indicating means for indicating the force applied to a wheel of the automobile to turn it under brake resistance, and automobile anchoring means having a collapsible construction and adapted to be raised when attached to an automobile to hold its wheels in place upon the supporting and turning means and constructed to collapse when not in use.

17. A brake tester for testing the action of the brakes on the wheels of an automobile that the brake resistance on the opposite wheels may be measured and equalized, comprising in combination, wheel supporting and turning means mounted to support and turn one wheel of an automobile, another wheel supporting and turning means to support and turn the opposite wheel of an automobile, power mechanism for driving each wheel supporting and turning means independently of the other to rotate the wheel resting upon a wheel supporting and turning means through a complete revolution under brake resistance, indicating means for indicating the force applied to a wheel of the automobile to turn it under brake resistance, and a collapsible anchoring lever located adjacent said supporting and turning means and adapted to be secured to the automobile to hold its wheels in place upon the supporting and turning means.

18. A brake tester for testing the action of a brake upon a wheel of an automobile, comprising in combination, a supporting frame, wheel supporting and turning means mounted to support and turn a wheel resting thereupon under brake resistance, a motor for driving the wheel supporting and turning means to turn the wheel under brake resistance, power transmitting mechanism between the motor and said means including cooperating gears mounted in a closed casing, an oil pump driven by the motor to lubricate said gears, and indicating means for indicating the force necessary to turn the wheel being tested under brake resistance.

19. A brake tester for testing the action of a brake upon a wheel of an automobile, comprising in combination, a compact, self-contained unit consisting of a frame, wheel supporting and rotating means mounted upon the frame to support and rotate a wheel of an automobile through a complete revolution under brake resistance, a motor mounted upon the frame to drive said wheel supporting means, driving gears disposed at the outer side of the wheel between said motor and wheel supporting means and one of said gears being supported for floating movement in response to variations in the turning force imparted to the automobile wheel, and indicating means positioned to be actuated by said floating movement.

20. A brake tester for testing the action of a brake upon a wheel of an automobile, comprising in combination, a compact, self-contained unit consisting of a frame, rollers mounted upon said frame to support and rotate a wheel of an automobile under brake resistance, a motor mounted upon the frame to drive said rollers, a driving connection between the motor and rollers including an element mounted at the outer side of the wheel for floating movement in response to variations in the turning force transmitted to the rollers, an indicator, and a connection between said floating element and indicator to actuate the indicator.

21. A brake tester for testing the action of a brake upon a wheel of an automobile, comprising in combination, a compact, self-contained unit consisting of a frame, rollers mounted upon the frame to support and rotate a wheel of an automobile under brake resistance, a motor mounted to drive said rollers, gears for driving the rollers from the motor, an element disposed at the outer side of the wheel for supporting one of the gears for floating movement in response to variations in the driving force and having a projecting arm, and an indicator connected to said arm and adapted to be actuated thereby to indicate the turning force applied to the automobile wheel.

22. A brake tester for testing the action of a brake upon a wheel of an automobile, comprising in combination, a compact, self-contained unit consisting of a frame, rollers mounted upon the frame to support and rotate a wheel of an automobile under brake resistance, a motor mounted to drive said rollers, a driving connection between the motor and rollers including a worm adapted to lock the rollers against rotation by the wheel of the automobile when the motor is not operating and a floating gear supported to move in response to variations in the power transmitted to the rollers, and an indicator positioned to be actuated by the movement of said floating gear to indicate the turning force exerted upon the automobile wheel.

23. A brake tester for testing the action of a brake upon a wheel of an automobile, comprising in combination, a supporting frame, wheel supporting and rotating means mounted upon the frame to support and rotate a wheel of an automobile through a complete revolution under brake resistance, a motor for driving said means, a series of reducing gears between the motor and said means and adapted to rotate the automobile wheel at a sufficiently slow speed to permit variations in the brake action upon different portions of the wheel during one complete revolution to be noted, means for supporting one of said gears for yielding movement in response to variations in the turning force applied to the wheel, and indicating means adapted to be actuated by said yielding movement.

24. A self contained unit for testing the action of a brake upon a wheel of an automobile, comprising in combination, a supporting frame, wheel supporting and turning means mounted upon said frame to support and rotate the wheel through a complete revolution under brake resistance, a driving motor on said frame, a pressure responsive driving connection between the wheel supporting and turning means and motor including a worm gear adapted to lock the wheel turning means against movement when the motor is not operating to thereby present a fixed traction surface to an automobile wheel as the latter is moved into and out of engagement with said means and indicating means associated with said pressure responsive connection and adapted to be operated thereby to indicate the turning force applied to the automobile wheel to turn it under brake resistance.

25. A self-contained unit for testing the brakes of an automobile that the brake resistance on a wheel may be measured, comprising in combination, a portable support, wheel supporting and turning means mounted on the portable support for turning a wheel of an automobile through a complete revolution while under brake resistance, a motor mounted on the support at the outer side of the wheel being tested, driving connections between the motor and wheel supporting and turning means, including a yielding device on the portable support which is yieldingly responsive to variation in the turning force required to turn the wheel while under brake resistance, and indicating means connected to the yielding device in the driving connections and operated thereby to indicate the force required to turn the wheel resting on the wheel supporting and turning means at all points of its complete rotation.

26. A self-contained unit for testing the brakes of an automobile that the brake resistance on a wheel may be measured, comprising in combination, a supporting frame, wheel supporting and turning rollers mounted on the supporting frame for turning a wheel of an automobile through a complete rotation while under brake resistance, a motor mounted on the supporting frame, a motor driven shaft carried by the supporting frame at right angles to the wheel supporting and turning rollers, driving connections between the motor driven shaft and rollers including a yielding device on the supporting frame yieldingly responsive to variations in the turning force required to turn the wheel while under brake resistance, an indicating lever mounted on the supporting frame, connections between the lever and yielding device for movement by the latter during its yielding action, an indicator on said supporting frame, and connections between the lever and indicator for operating the latter by movement of the lever in response to the movement of the yielding device.

27. A self contained unit for testing the brakes of an automobile that the brake resistance on a wheel may be measured, comprising in combination, a supporting frame, wheel supporting and turning rollers mounted on the frame for turning a wheel of an automobile through a complete rotation under brake resistance, a motor mounted upon said frame, cooperating gears for driving the rollers from said motor, means for supporting one of the gears for floating movement in response to variations in the turning force it transmits, an arm operable by the floating movement of said gear, a lever pivotally supported upon said frame and provided with a short arm and a long arm, a connection between said first mentioned arm and said short arm, and an indicator mounted upon said frame and connected to said long arm to be operated thereby to indicate the turning force imparted to the automobile wheel.

28. A self contained unit for testing the brakes of an automobile, comprising a frame, a wheel supporting roller mounted on the frame to turn the wheel of an automobile through a complete revolution under brake resistance, a motor, a transmission dynamometer for driving the roller from the motor and mounted on the frame at the outer side of the wheel it rotates, and indicating means operable by the dynamometer to indicate the turning force imparted to the wheel to turn it under brake resistance.

29. A self contained unit for testing the brakes of an automobile, comprising a frame, a wheel supporting roller mounted on the frame to turn the wheel of an automobile through a complete revolution under brake resistance, means for driving the roller including a motor and a transmission dynamometer mounted on the frame at the outer side of the wheel they rotate, and indicating means operable by the dynamometer to indicate the turning force imparted to the wheel to turn it under brake resistance.

In testimony whereof, I have signed my name to this specification.

CHARLES F. COWDREY.